(12) United States Patent
Ashibe et al.

(10) Patent No.: US 7,498,519 B2
(45) Date of Patent: Mar. 3, 2009

(54) JOINT FOR SUPERCONDUCTING CABLE

(75) Inventors: Yuuichi Ashibe, Osaka (JP); Hiroshi Takigawa, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 516 days.

(21) Appl. No.: 10/560,423

(22) PCT Filed: Feb. 17, 2005

(86) PCT No.: PCT/JP2005/002427

§ 371 (c)(1),
(2), (4) Date: Dec. 14, 2005

(87) PCT Pub. No.: WO2005/086291

PCT Pub. Date: Sep. 15, 2005

(65) Prior Publication Data

US 2006/0162951 A1   Jul. 27, 2006

(30) Foreign Application Priority Data

Mar. 4, 2004   (JP) ............................. 2004-060779

(51) Int. Cl.
*H01B 12/00* (2006.01)
(52) U.S. Cl. ..................................... 174/125.1; 505/230
(58) Field of Classification Search ......... 505/230–232; 174/125.1
See application file for complete search history.

(56) References Cited

U.S. PATENT DOCUMENTS 7,279,639 B2 * 10/2007 Ashibe et al. ............ 174/125.1

FOREIGN PATENT DOCUMENTS

| CA | 2154656 | 8/1994 |
|----|---------|--------|
| DE | 43 01 944 A1 | 7/1994 |
| JP | 62-272502 A | 11/1987 |
| JP | 2000-340274 A | 12/2000 |
| JP | 2002-140943 A | 5/2002 |
| SU | 714510 A1 | 12/2000 |

OTHER PUBLICATIONS

English translation of Russian Decision on Grant Patent For Invention; Application No. 2005140033/09 (044625).
Supplementary European Search Report for European Patent Application No. 05719229.6-1231 dated Feb. 5, 2008.

* cited by examiner

*Primary Examiner*—Jeremy C Norris
(74) *Attorney, Agent, or Firm*—Foley & Lardner LLP

(57) ABSTRACT

A joint for a superconducting cable joints superconducting cables with one another. The superconducting cable comprises a former, superconducting conductor, and insulating layer. The construction of the joint comprises the following steps: preparing a jointing ferrule for jointing the formers, sliding the ferrule over the end portions of the formers to be jointed, butting the end faces of the formers against each other in the jointing ferrule, compressing the jointing ferrule to joint the formers such that the compressed ferrule has a diameter equal to that of the former of the superconducting cable, butting the end faces of the superconducting conductors against each other at the outside of the compressed ferrule, and jointing the superconducting conductors with each other such that the jointed superconducting conductors have a diameter equal to that of the superconducting conductor of the superconducting cable. The foregoing steps can decrease the size of the joint.

8 Claims, 3 Drawing Sheets

JOINT FOR SUPERCONDUCTING CABLE

TECHNICAL FIELD

The present invention relates to a joint for a superconducting cable, particularly a joint whose size can be decreased.

BACKGROUND ART

In the field of a superconducting cable provided with a superconducting conductor composed of, for example, Bi-based high-Tc superconducting tapes or wires, researchers and engineers have been developing not only a single-phase cable, which is provided with one cable core, but also a multiphase cable, in which a plurality of cable cores are held together to form a multicore-bundled-in-one type cable. FIGS. 2(A) and 2(B) show a three-phase superconducting cable, in which three cores are held together. A superconducting cable 100 has a structure in which three cable cores 102 are twisted together to be housed in a heat-insulated pipe 101. The meaning of the term "wire" used in this Description and in the accompanying Claims is not limited to a wire having a circular cross section. The meaning includes a wire having a rectangular cross section.

The heat-insulated pipe 101 forms a dual pipe composed of an outer pipe 101a and an inner pipe 101b. Although not shown in FIG. 2(A), a heat-insulating material is placed between the two pipes, and the space between the two pipes is evacuated into vacuum. An anticorrosion layer 104 is formed on the outer pipe 101a. Each of the cable cores 102 is provided with a former 200, a superconducting conductor 201, an electrically insulating layer 202, a shielding layer 203, and a protective layer 204 in this order from the center. The superconducting conductor 201 is structured by helically winding superconducting wires in multiple layers on the former 200. The electrically insulating layer 202 is structured by wrapping tapes of semisynthetic insulating paper. The shielding layer 203 is structured by helically winding on the electrically insulating layer 202 superconducting wires similar to those used as the superconducting conductor 201. In the shielding layer 203, an electric current having nearly the same magnitude as that of the current flowing in the superconducting conductor 201 is induced in a steady state and flows in the direction opposite to that of the current in the conductor 201. The magnetic field produced by the induced current cancels out the magnetic field produced by the current flowing in the superconducting conductor 201. As a result, the magnetic field leaking to the outside of the cable core 102 can be decreased to nearly zero. Usually, interstices 103 produced by the inner pipe 101b and the individual cable cores 102 are used as the coolant channel.

When such a multiphase superconducting cable is used to construct a long-distance transmission line, it is necessary to use a joint to joint cable cores drawn out of neighboring cables at some midpoint in the line. An example of such a joint is stated in the Patent Document 1. The structure of this joint is shown in FIG. 3. FIG. 3 shows that ends of the neighboring superconducting conductors 201 housed in a joint box 500 are jointed with each other with a jointing ferrule 510 made of normally conducting material such as copper. A stress relief cone 520 is placed over the end portions of the superconducting conductors 201 and the jointing ferrule 510. The stress relief cone 520 is supported with supporting rods 530 made of fiber-reinforced plastic (FRP). The cable core 102 in the joint box is supported with a supporter 540 made of FRP. (See the Patent Document 1.)

Patent Document 1: published Japanese patent application Tokukai 2000-340274 (FIG. 1)

DISCLOSURE OF INVENTION

Problems to be Solved by the Invention

However, the above-described technology has the following drawbacks.

(1) The joint has a large amount of heat generation.

The foregoing joint uses a normally conducting material as the jointing ferrule. Consequently, this portion has a conductor resistance larger than that of the superconducting conductor and generates heat at the joint due to the Joule loss. As a result, the cooling system for the coolant is burdened.

(2) The joint has a large size.

The foregoing joint uses a jointing ferrule having an outer diameter larger than that of the superconducting conductor. This configuration produces longitudinal electrical stress in the insulation. To relieve this stress, it is necessary to provide a stress relief cone. The stress relief cone is formed by wrapping sheets of insulating paper, for example. As a result, the size of the joint increases both radially and longitudinally. In addition, because the stress relief cone is formed by using a large amount of insulating paper, which has large thermal resistivity, the stress relief cone has large thermal resistance. The combination of this large thermal resistance and the heat generation at the jointing ferrule due to the Joule loss can cause the joint to become the largest bottle neck in the cooling system.

(3) The joint may produce a pressure loss in the coolant.

The foregoing joint is provided with the stress relief cone and the FRP supporting rods to support the stress relief cone. The supporting rods may become an obstacle against the flow of the coolant, producing a pressure loss. This pressure loss may adversely affect the cooling ability for the joint.

In view of the above-described circumstances, a main object of the present invention is to offer a joint for a superconducting cable, which joint can be decreased in size.

Another object of the present invention is to offer a joint for a superconducting cable, which joint can suppress the generation of the Joule loss in it.

Means for Solving the Problems

According to the present invention, the foregoing objects are attained by jointing butted superconducting conductors with each other such that the superconducting conductor in the joint has the same diameter as that of the superconducting conductor at anywhere else.

A joint of the present invention is a joint for a superconducting cable. The joint is for jointing two lengths of the superconducting cable with each other. The superconducting cable is provided with a former, a superconducting conductor, and an insulating layer. The construction of the joint includes the following steps:

(a) preparing a jointing ferrule for jointing the formers;
(b) sliding the jointing ferrule over the end portions of the formers to be jointed;
(c) butting the end faces of the formers against each other in the jointing ferrule;
(d) compressing the jointing ferrule so as to joint the formers such that the compressed ferrule has a diameter equal to that of the former of the superconducting cable;
(e) butting the end faces of the superconducting conductors to be jointed against each other at the outside of the compressed ferrule; and (f) jointing the superconducting conductors with each other such that the jointed superconducting conductors have a diameter equal to that of the superconducting conductor of the superconducting cable.

In the foregoing steps, first, a conductor-jointing ferrule is slid over the butted formers to be jointed. The ferrule is compressed with a hydraulic press such that the compressed ferrule has a diameter practically equal to that of the former of the superconducting cable. This method enables the jointing of the formers without increasing the diameter of the jointed portion. Consequently, the diameter of the superconducting conductor placed over the former, also, can be suppressed from increasing only at the jointed portion. Therefore, the superconducting conductors can be jointed either by directly butting them or by slightly overlapping them. On top of that, this method eliminates the necessity of the use of the stress relief cone As a result, the joint can be decreased in size, particularly in diameter.

Because the superconducting conductors can be jointed directly, it is not necessary to use a jointing ferrule made of a normally conducting conductor. Therefore, the generation of the Joule loss can be suppressed.

Here, it is desirable that the formers be jointed by the compression jointing method using a jointing ferrule. To enable this method, it is desirable that the former have a solid-core structure or a stranded-wire structure. This type of structure includes one in which a plurality of metal wires are stranded.

To enable the compression jointing, it is desirable that the jointing ferrule be a metal ferrule that can readily deform plastically. Most typically, a copper ferrule is available. The thickness of the ferrule is determined such that the cross-sectional area of the ferrule after the compression can be secured to be, for example, at least 50 percent of the nominal cross-sectional area of the former of the superconducting cable. By using the foregoing ferrule, the compression jointing is performed such that the compressed ferrule has a diameter practically equal to that of the former. This method readily secures the current-carrying capacity and mechanical strength at the jointed portion.

The types of the superconducting conductor include one having a structure in which superconducting wires are helically wound on the former. The superconducting wire is formed by embedding a number of, for example, Bi-2223 superconducting filaments in a matrix of silver or the like. The superconducting wires are usually wound in multiple layers. The superconducting conductors can be jointed by soldering, for example. The direct jointing of the superconducting conductors without the intervention of a normally conducting conductor can eliminate the Joule loss due to the presence of the normally conducting conductor.

It is desirable that the joint be provided with a restoring insulating layer at the outside of the superconducting conductor such that the restoring insulating layer has a diameter equal to that of the insulating layer of the superconducting cable. The restoring insulating layer is a member for securing the electrical insulation at the joint. The restoring insulating layer can be formed by wrapping insulating paper, for example. In this case, unlike the stress relief cone, it is not necessary to increase the thickness and to form a spindle-type shape. Therefore, the size of the joint can be decreased considerably in comparison with that of the conventional joint.

The superconducting cable to be jointed by using a joint of the present invention may further be provided with a shielding layer. For example, the shielding layer is formed by helically winding or linearly arranging superconducting wires similar to those used as the superconducting conductor on the insulating layer. In this case, also, the above-described restoring insulating layer is provided at the outside of the superconducting conductor in the joint. The restoring insulating layer, also, has a diameter equal to that of the insulating layer of the superconducting cable. It is desirable that the shielding layers butted at the outside of the restoring insulating layer be jointed with each other such that the jointed shielding layers have a diameter equal to that of the shielding layer of the superconducting cable. This structure can suppress the diameter of the joint from increasing even for the cable having the shielding layer. The shielding layers can also be jointed with each other by soldering, for example.

Usually, superconducting cables have a channel for a coolant that cools the superconducting conductor (when the shielding layer is provided, it is also cooled by the coolant). It is desirable that a joint of the present invention be provided with an outer case that can secure a coolant channel having a cross-sectional area nearly equal to that of the coolant channel of the superconducting cable. The securing of the coolant channel having a cross-sectional area nearly equal to that of the coolant channel of the superconducting cable at the joint can suppress the pressure loss of the coolant at the joint. The outer case can be constituted with a heat-insulated case covering the restoring insulating layer of the joint, for example. When the joint is provided with a shielding layer, the outer case can be a heat-insulated case covering the shielding layer. It is desirable that the outer case be structured such that it can be divided into short sections. The divided structure of the outer case enables the assembling work of the joint in a narrow working space.

A joint of the present invention can be used not only for jointing single-core superconducting cables but also for jointing the individual cores of three-core-twisted superconducting cables.

ADVANTAGEOUS EFFECT OF THE INVENTION

According to a joint of the present invention, the jointed portion of the former can be formed such that its diameter is nearly equal to that of the former of the superconducting cable. As a result, the size of the joint can be decreased. In addition, no normally conducting conductor is required to intervene for jointing the superconducting conductors. Therefore, the heat generation due to the Joule loss can be suppressed.

EXPLANATIONS OF LETTERS OR NUMERALS

Figure 1:
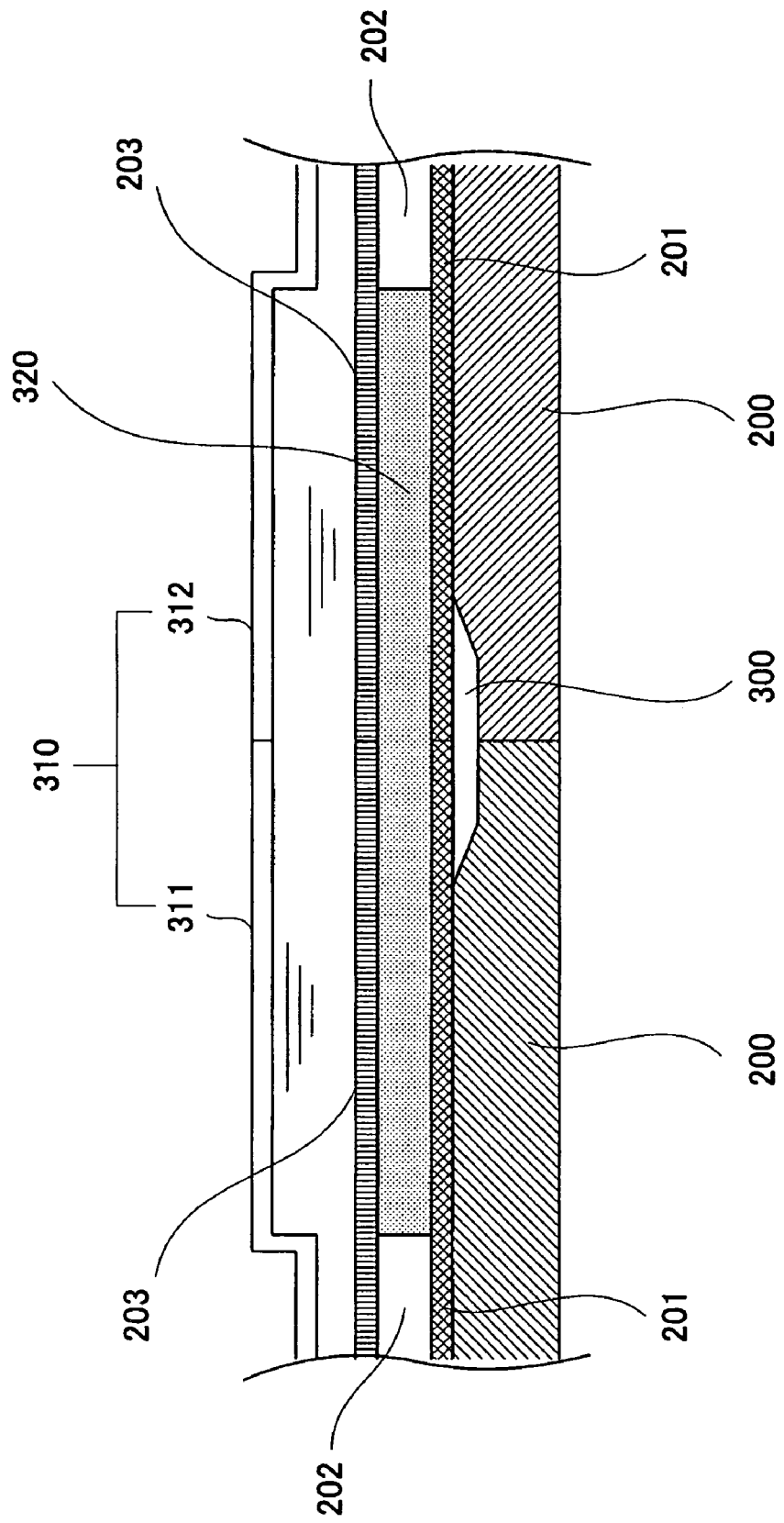
FIG. 1 is a partial longitudinal sectional view of a joint of the present invention.

100; three-phase cores superconducting cable, 101; heat-insulated pipe, 101a; outer pipe, 101b; inner pipe, 102; cable cores, 103; interstice, 104; anticorrosion layer, 200; former, 201; superconducting conductor, 202; insulating layer, 203; shielding layer, 204; protective layer, 300; jointing ferrule, 310; outer case, 311, 312; divided halves, 320; restoring insulating layer, 500; joint box, 510; jointing ferrule, 520; stress relief cone, 530; 540; supporting rod, supporter.

BEST MODE FOR CARRYING OUT THE INVENTION

Embodiments of the present invention are explained below. The ratio of the dimensions in the drawing does not necessarily coincide with that of the explanation.

Figure 2:
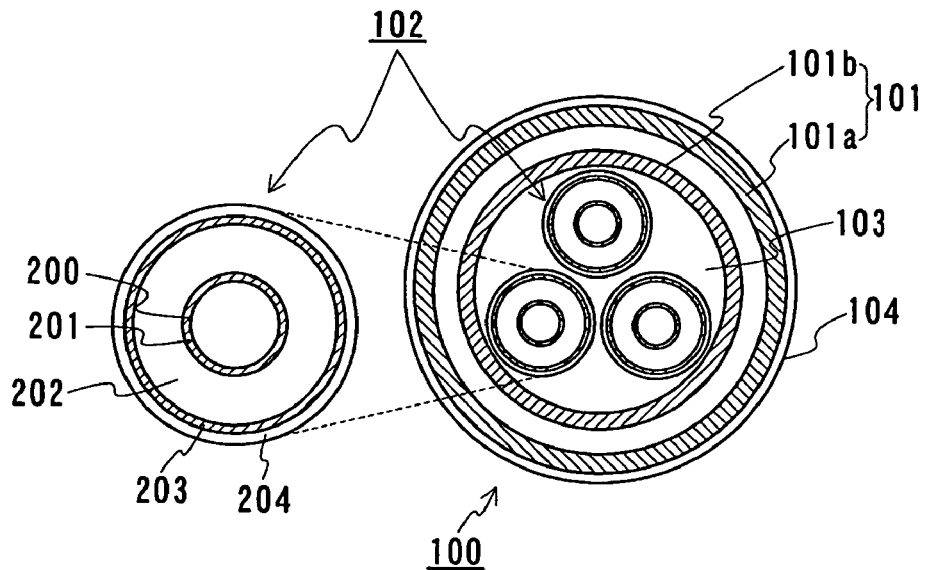
FIG. 2(A) is a cross-sectional view showing a superconducting cable to be jointed by using a joint of the present invention.
FIG. 2(B) is a perspective view showing one of the cable cores shown in FIG. 2(A) in a state in which individual members are exposed on a step-by-step basis.
Figure 2:
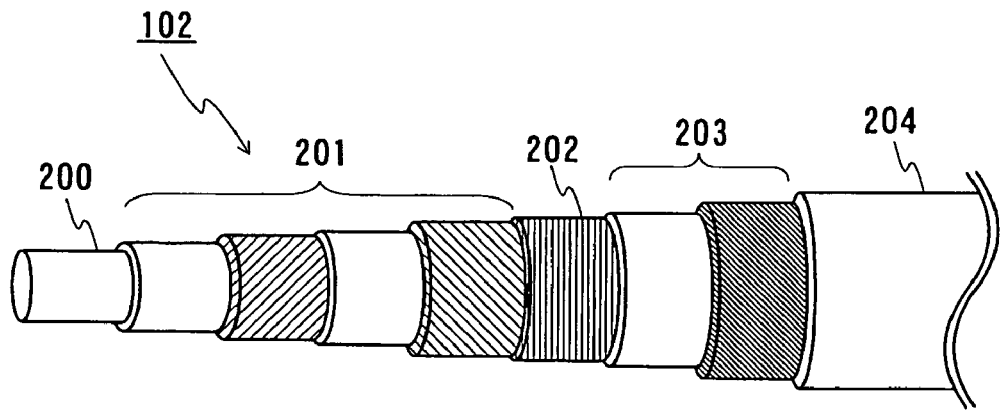
Figure 3:
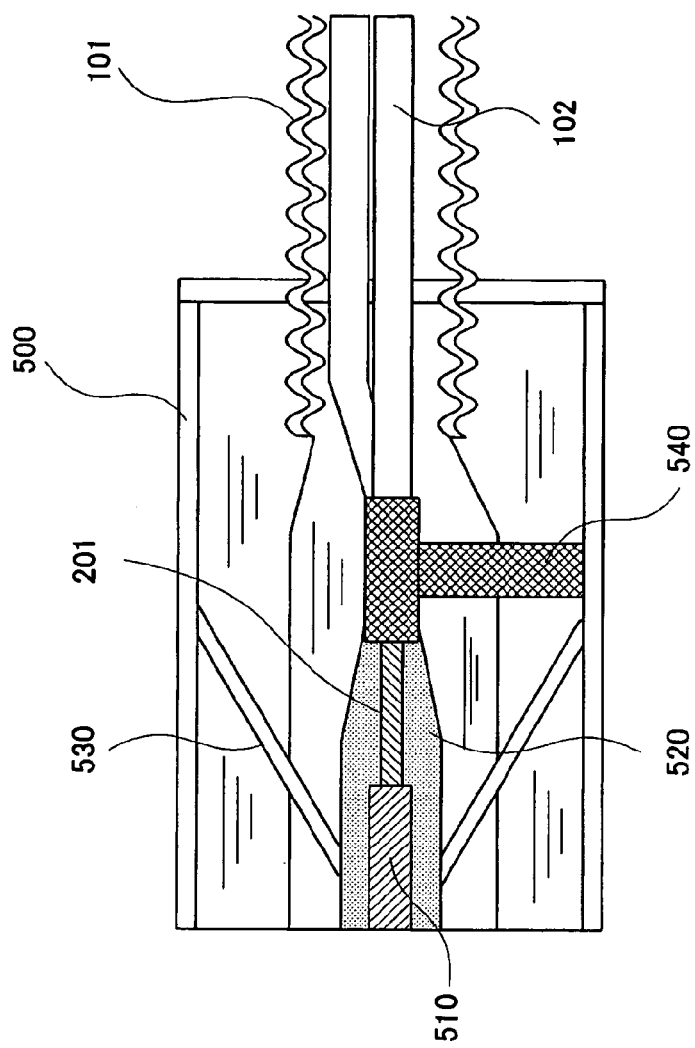
FIG. 3 is a partial sectional view of a conventional joint.

The structure of the superconducting cable to be jointed is first explained before the explanation of a joint of the present invention. The superconducting cable to be jointed by using the joint has a structure similar to that of the superconducting cable 100 explained by referring to FIGS. 2(A) and 2(B). More specifically, the three cores 102 are housed in the heat-insulated pipe 101. Each of the cores 102 is provided with the former 200, the superconducting conductor 201, the insulating layer 202, the shielding layer 203, and the protective layer 204 in this order from the center. The former 200 is structured by stranding a plurality of copper wires in multiple layers. The superconducting conductor 201 is structured by helically winding superconducting wires in multiple layers on the former 200. The superconducting wire is formed by embedding a number of Bi-2223 superconducting filaments in a silver matrix. The insulating layer 202 is structured by wrapping on the superconducting conductor 201 tapes of semisynthetic insulating paper, which is produced by laminating insulating paper and polypropylene film. The shielding layer 203 is structured by helically winding in multiple layers on the insulating layer 202 superconducting wires similar to those used as the superconducting conductor 201.

FIG. 1 shows a joint that joints the above-described superconducting cables 100 with each other. When the superconducting cables are jointed with each other, the individual cores are exposed in some length from the end of the heat-insulated pipe, and the exposed length of each of the layers core-constituting members is adjusted at the end portion of the core. More specifically, the length of the former 200, the superconducting conductor 201, and the shielding layer 203 is maintained unchanged from the moment the core is exposed. On the other hand, a predetermined length of the insulating layer 202 is removed from the cut end of the core. In order to remove the insulating layer 202, the end portion of the shielding layer 203, which is structured by winding the superconducting wires, is spread out by unwinding the wires, so that the insulating layer 202 is exposed. Under this condition, the predetermined length of the insulating layer 202 is removed. The removing length is determined such that the length can allow the sufficient implementation of the below-described compressing operation of the jointing ferrule 300 to the former 200. Although not shown in the drawing, there is an alternative method. In this method, a predetermined length of each of the superconducting conductor, the insulating layer, and the shielding layer is cut removed from the end of the exposed core, so that a predetermined length of the former is exposed. When this method is employed, after the formers are jointed, the superconducting conductors are jointed with one another through the intervention of separately prepared superconducting wires for the jointing. The same procedure is applied to the jointing of the shielding layers.

To joint a pair of superconducting cables with each other, first, the below-mentioned divided halves 311 and 312 of the outer case 310 are slid over the end portion of the grouped three cores. Then, the outer case 310 is moved along the cores to a place remote from the end portion of the cores. Notwithstanding the above explanation, only one core is shown in FIG. 1.

A jointing ferrule 300 is prepared that has a thickness sufficient to secure the cross-sectional area that is at least 50 percent of the nominal cross-sectional area of the former 200 after the compression of the ferrule. The former 200 is inserted into the ferrule 300 from each end. In this case, the ferrule 300 is used that is produced by using a tough pitch copper rod (1100BD) and that has an inner diameter slightly larger than the outside diameter of the former. Under this condition, the jointing ferrule 300 is compressed to joint the formers 200 with each other. This jointing operation causes the ferrule to dig into the former, so that after the compression of the ferrule, the diameter of the jointing ferrule 300 becomes practically equal to that of the former at the place other than the compressed portion.

Subsequently, the superconducting conductors 201 are jointed by soldering on the jointed former 200. Because no diameter difference exists between the surface of the compressed ferrule and that of the former, when the superconducting wires are jointed either by rewinding previously unwound and spread out superconducting wires or by preparing separate superconducting wires for jointing, the superconducting conductors 201 themselves can be jointed without the diameter difference between the place where the conductors cover the compressed ferrule 300 and the place other than that place. On top of that, it is not necessary to use a normally conducting material as an intervening member to joint the superconducting conductors. Therefore, this structure can suppress the heat generation due to the Joule loss at the joint.

Next, a restoring insulating layer 320 is formed on the jointed superconducting conductor 201. The predetermined length of the insulating layer 202 is previously removed from the end of the individual cores of the superconducting cable. The removed portion can be restored by wrapping the insulating paper, for example. Thus, the restoring insulating layer 320 is formed. The diameter of the restoring insulating layer 320 is also adjusted so as to coincide with that of the insulating layer 202 of the core. Because both the superconducting conductor or and the member that is electrically connected with the conductor do not radially bulge at any local positions, it is not necessary to form the stress relief cone. Consequently, the required electrical insulation can be secured even with the restoring insulating layer 320 having the same thickness as that of the insulating layer 202 of the core.

Next, the restoring insulating layer 320 is covered with the shielding layer 203 either by rewinding the previously unwound and spread out superconducting wires or by preparing separate superconducting wires for jointing. In the former case, the superconducting wires are jointed with one another by soldering. In the latter case, the superconducting wires forming the shielding layer and the separately prepared superconducting wires for jointing are jointed with each other by soldering. By the above-described method of jointing the shielding layers 203, the shielding layers 203 themselves can be jointed without the diameter difference between the place where the shielding layers cover the restoring insulating layer 320 and the place other than that place. When the individual members of the core are jointed by the above-described procedure, the jointed portion can have the same diameter as that of the core of the superconducting cable. In other words, the size of the joint can be decreased to the smallest possible degree.

Subsequently, the divided halves 311 and 312 of the outer case, which are previously moved along the cores to a place remote from the end portion of the cores, are returned to the place just outside the formed restoring insulating layer 320, so that they are jointed with each other at this place. The divided halves 311 and 312 are each a circular cylinder having a heat-insulating structure. Their one end has a diameter larger than that of the other end. The open end at the larger-diameter side of the divided half 311 is butted against that of the divided half 312. The butted portion is consolidated either by welding or by using flanges which are securely tightened with bolts. The consolidation of the divided halves 311 and 312 forms the outer case 310, which has a smaller diameter at both end portions and a larger diameter at the center portion. Although not shown in FIG. 1, both ends of the outer case 310 are each jointed with the end of the heat-insulated pipe 101 of the superconducting cable (see FIG. 2(A)).

The inside diameter of the smaller-diameter portions of the outer case 310 is designed to be equal to or larger than the inside diameter of the heat-insulated pipe of the superconducting cable. The space between the inside wall of the outer case 310 and the outside surface of the shielding layer is used as the coolant channel. Therefore, the foregoing design secures the coolant channel having a cross-sectional area nearly equal to that of the coolant channel in the superconducting cable. As a result, the pressure loss of the coolant at the joint can be suppressed.

INDUSTRIAL APPLICABILITY

A joint of the present invention is expected to be used for jointing superconducting cables in a superconducting cable line used as an electric-power transmission line or the like.

The invention claimed is:

1. A joint for a superconducting cable, the joint being for jointing two lengths of the superconducting cable with each other, the superconducting cable comprising a former, a superconducting conductor, and an insulating layer;
    the construction of the joint comprising the steps of:
    (a) preparing a jointing ferrule for jointing the formers;
    (b) sliding the jointing ferrule over the end portions of the formers to be jointed;
    (c) butting the end faces of the formers against each other in the jointing ferrule;
    (d) compressing the jointing ferrule onto the end portions of the formers to be jointed so as to joint the formers such that the compressed ferrule and one of the end portions have a combined diameter approximately equal to that of a remaining portion of the former of the superconducting cable;
    (e) butting the end faces of the superconducting conductors to be jointed against each other at the outside of the compressed ferrule; and
    (f) jointing the superconducting conductors with each other such that the jointed superconducting conductors have a diameter equal to that of the superconducting conductor of the superconducting cable.

2. A joint for a superconducting cable as defined by claim 1, wherein the construction of the joint further comprises the step of providing a restoring insulating layer at the outside of the superconducting conductor such that the restoring insulating layer has a diameter equal to that of the insulating layer of the superconducting cable.

3. A joint for a superconducting cable as defined by claim 2, wherein:
    (a) the superconducting cable further comprises a shielding layer; and
    (b) the construction of the joint further comprises the steps of:
    (b1) butting the end faces of the shielding layers to be jointed against each other at the outside of the restoring insulating layer; and
    (b2) jointing the shielding layers with each other such that the jointed shielding layers have a diameter equal to that of the shielding layer of the superconducting cable.

4. A joint for a superconducting cable as defined by claim 3, wherein:
    (a) the superconducting cable yet further comprises a channel for a coolant that cools the superconducting conductor; and
    (b) the joint comprises an outer case that can secure a coolant channel having a cross-sectional area nearly equal to that of the coolant channel of the superconducting cable.

5. A joint for a superconducting cable as defined by claim 2, wherein:
    (a) the superconducting cable yet further comprises a channel for a coolant that cools the superconducting conductor; and
    (b) the joint comprises an outer case that can secure a coolant channel having a cross-sectional area nearly equal to that of the coolant channel of the superconducting cable.

6. A joint for a superconducting cable as defined by claim 1, wherein:
    (a) the superconducting cable yet further comprises a channel for a coolant that cools the superconducting conductor; and
    (b) the joint comprises an outer case that can secure a coolant channel having a cross-sectional area nearly equal to that of the coolant channel of the superconducting cable.

7. A joint for a superconducting cable as defined by claim 1, the remaining portion of the former is adjacent the end portion of the former.

8. A joint for a superconducting cable as defined by claim 1, the remaining portion of the former is not in contact with the jointing ferrule.

* * * * *